United States Patent
Sondur

(10) Patent No.: US 7,466,964 B2
(45) Date of Patent: Dec. 16, 2008

(54) WIRELESS COMMUNICATION DEVICE AND METHOD FOR COORDINATED CHANNEL ACCESS WITH REDUCED LATENCY IN A WIRELESS NETWORK

(75) Inventor: Lakshmipathi Sondur, Karnataka (IN)

(73) Assignee: Intel Corporation, Santa Clara, CA (US)

( * ) Notice: Subject to any disclaimer, the term of this patent is extended or adjusted under 35 U.S.C. 154(b) by 589 days.

(21) Appl. No.: 11/172,449

(22) Filed: Jun. 29, 2005

(65) Prior Publication Data

US 2007/0004347 A1    Jan. 4, 2007

(51) Int. Cl.
  *H04B 1/02*    (2006.01)
  *H04B 17/00*   (2006.01)
(52) U.S. Cl. .................. 455/101; 455/91; 455/115.1
(58) Field of Classification Search .......... 455/101, 455/91, 115.1, 132, 140, 428, 422.1, 420, 455/423, 425; 370/229, 245, 443, 444, 462, 370/449, 431
See application file for complete search history.

(56) References Cited

U.S. PATENT DOCUMENTS

| 5,274,841 | A  | * | 12/1993 | Natarajan et al. ........... 370/337 |
| 5,896,561 | A  | * | 4/1999  | Schrader et al. .......... 455/67.11 |
| 6,229,799 | B1 | * | 5/2001  | Caillerie et al. ............ 370/347 |
| 6,504,834 | B1 | * | 1/2003  | Fifield ...................... 370/345 |
| 6,847,313 | B2 |   | 1/2005  | Biswas |
| 7,006,530 | B2 | * | 2/2006  | Spinar et al. ................ 370/468 |
| 7,286,617 | B2 |   | 10/2007 | Vanderperren et al. |
| 7,313,203 | B2 |   | 12/2007 | Tubbax et al. |
| 7,324,607 | B2 |   | 1/2008  | Guchhait |
| 7,327,800 | B2 |   | 2/2008  | Oprea et al. |
| 7,352,819 | B2 |   | 4/2008  | Lakshmipathi et al. |
| 2004/0005010 | A1 | | 1/2004 | He |
| 2005/0058215 | A1 | | 3/2005 | Biswas |
| 2005/0111427 | A1 | | 5/2005 | Li et al. |
| 2005/0129101 | A1 | | 6/2005 | Stephens et al. |
| 2005/0144307 | A1 | | 6/2005 | Le et al. |
| 2005/0147115 | A1 | | 7/2005 | Li et al. |
| 2006/0045220 | A1 | | 3/2006 | Biswas |
| 2006/0222095 | A1 | | 10/2006 | Niu et al. |
| 2007/0002749 | A1 | | 1/2007 | Sondur et al. |
| 2007/0002800 | A1 | | 1/2007 | Sondur et al. |
| 2007/0004337 | A1 | | 1/2007 | Biswas et al. |
| 2007/0104221 | A1 | * | 5/2007 | Venkatachalam ........... 370/468 |
| 2007/0173203 | A1 | | 7/2007 | Fei et al. |

FOREIGN PATENT DOCUMENTS

EP    1107620 A2    6/2001
WO    WO-0186993 A1    11/2001

(Continued)

OTHER PUBLICATIONS

"International Search Report for corresponding PCT Application No. PCT/US2006/025305", (Oct. 31, 2006), 3 pgs.

(Continued)

*Primary Examiner*—Sonny Trinh
(74) *Attorney, Agent, or Firm*—Schwegman, Lundberg & Woessner, P.A.; Gregory J. Gorrie

(57) ABSTRACT

Wireless communication devices and methods for coordinated channel access with reduced latency in a wireless network are generally described herein. Other embodiments may be described and claimed.

30 Claims, 8 Drawing Sheets

FOREIGN PATENT DOCUMENTS

| | | |
|---|---|---|
| WO | WO-2005/053235 A1 | 6/2005 |
| WO | WO-2007/002805 A1 | 1/2007 |
| WO | WO-2007/002924 A1 | 1/2007 |

OTHER PUBLICATIONS

Biswas, A., et al., "Channel Estimatin Techniques With Long Training Sequence for IEEE 802.11A", *2004 International Conference on Signal Processing & Communication (SPCOM '04)*, (2004), 136-139.

Cui, T., et al., "Robust Joint Frequencey Offset and Channel Estimation for OFDM Systems", *IEEE 60th Vehicular Technolgy Conference (VTC 2004-Fall)*, vol. 1., (204),603-607.

Egashira, N., et al., "Improvement of CCI Compesation Accuracy Using Feedback Phase Tracking in MIMO-OFDM Systems", *IEEE Global Telecommunication Conference (GLOBECOM '04)*, vol. 2, (2004), 923-927.

Frenkiel, R. H., et al., "The Infostations Challenge: Balancing Cost and Ubiquity in Delivering Wireless Data", *IEEE Personal Communications*, vol. 7, (apr. 2000), 66-71.

Moose, P. H., "A Technique for Orthofonal Frequency Division Multiplexing Frequency Offset Correction", *IEEE Transactions on Communications*, 42(10), (Oct. 1994), 2908-2914.

Pun, M., et al., "AN EM-Based Joint Maximum Likelihood Estimation of Carrier Frequency Offset and Channel for Uplink OFDMA Systems", *IEEE 60th Vehicular Technology Congernce (VTC 2004)*, (2004), 598-602.

Yu, C.-Y. , et al., "Design and Simulation of a MIMO OFDM Baseband Transceiver for High Throughput Wireless LAN", *Proceedings, 2004 IEEE Asia-Pacific Conference on Circuits and Systems*, vol. 1, (2004), 205-208.

\* cited by examiner

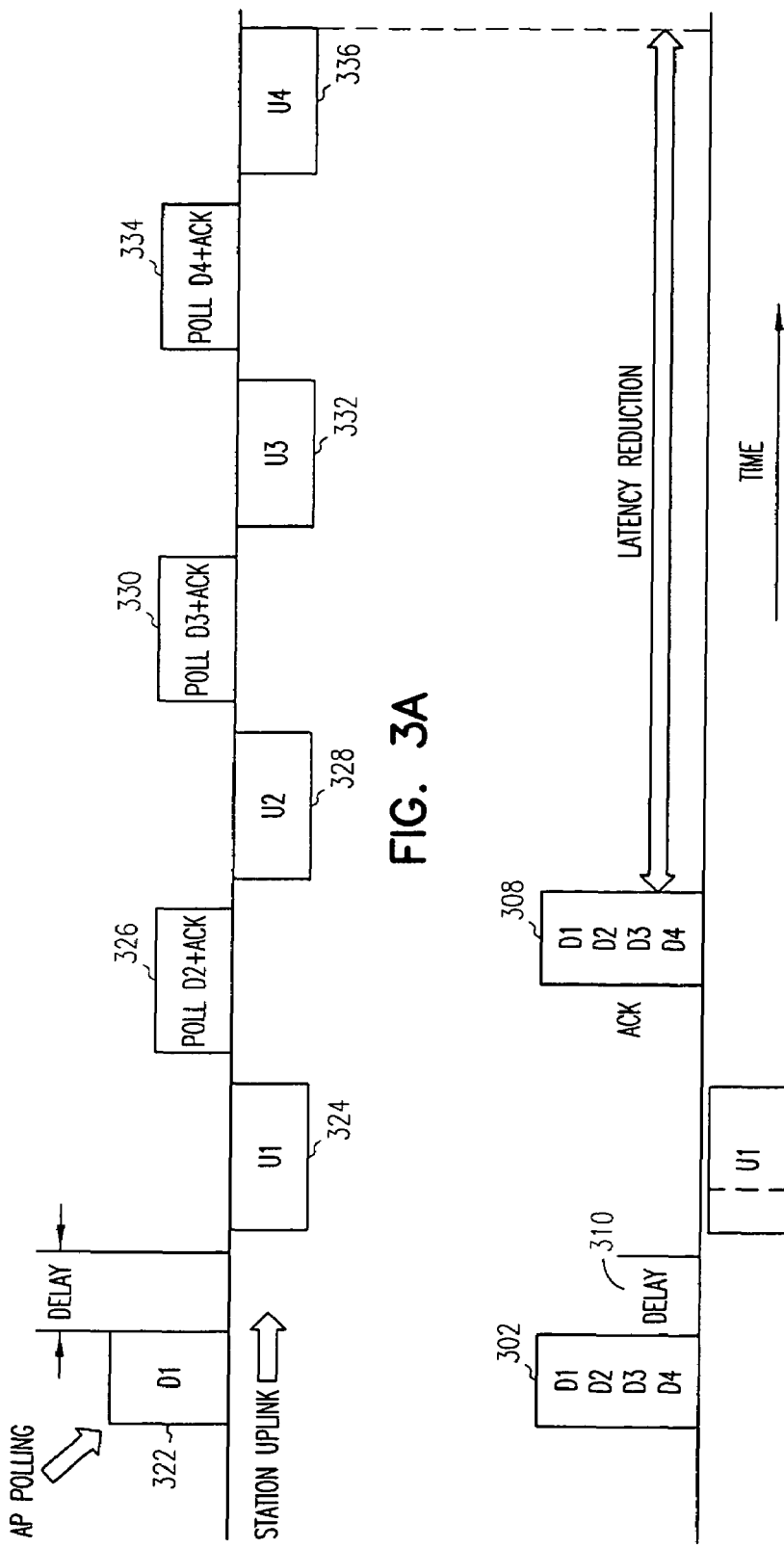

LTF 1 = $\{f_0, f_3, f_6, \ldots f_{60}\}$

LTF 2 = $\{f_1, f_4, f_7, \ldots f_{61}\}$

LTF 3 = $\{f_2, f_5, f_8, \ldots f_{62}\}$

LTF 4 = $\{f_3, f_6, f_9, \ldots f_{63}\}$

FIG. 4B

WIRELESS COMMUNICATION DEVICE AND METHOD FOR COORDINATED CHANNEL ACCESS WITH REDUCED LATENCY IN A WIRELESS NETWORK

CROSS REFERENCE TO RELATED APPLICATIONS

This patent application is related to U.S. patent applications having Ser. Nos. 11/172,451, 11/172,452, and 11/171,643 filed concurrently herewith.

TECHNICAL FIELD

Some embodiments of the present invention pertain to multicarrier wireless communications, and some embodiments pertain to coordinated channel access in wireless networks.

BACKGROUND

Some high data rate wireless networks use multi-user downlinks and single-user uplinks for communications with associated wireless communication devices. For example, in point to multipoint communications, an access point may transmit to several client stations the same or an aggregated packet. This communication environment is generally more suitable for applications that transmit large packets where packet latency is not a great concern. When several wireless communication devices operate in these wireless networks, the time between their communications generally increases. This increased latency may exceed the latency requirements of some time-sensitive applications, such as voice over the internet protocol (VoIP) or streamed video. This increased latency may result in packet delays, reducing the quality of the communications. Many of these wireless communication devices are portable and/or battery powered devices in which power consumption is directly affected by their packet transmission technique. Thus there are general needs for reducing the latency in wireless networks as well as reducing power consumption of wireless communication devices.

BRIEF DESCRIPTION OF THE DRAWINGS

FIG. 3A is a diagram illustrating some communications between a managing wireless communication device and associated wireless communication devices;

FIG. 3B is a diagram illustrating communications between a managing wireless communication device and associated wireless communication devices in accordance with some embodiments of the present invention;

FIGS. 4A and 4B illustrate uplink transmissions by four transmitting stations in accordance with embodiments of the present invention;

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to limit the scope of this application to any single invention or inventive concept if more than one is in fact disclosed.

Figure 1:
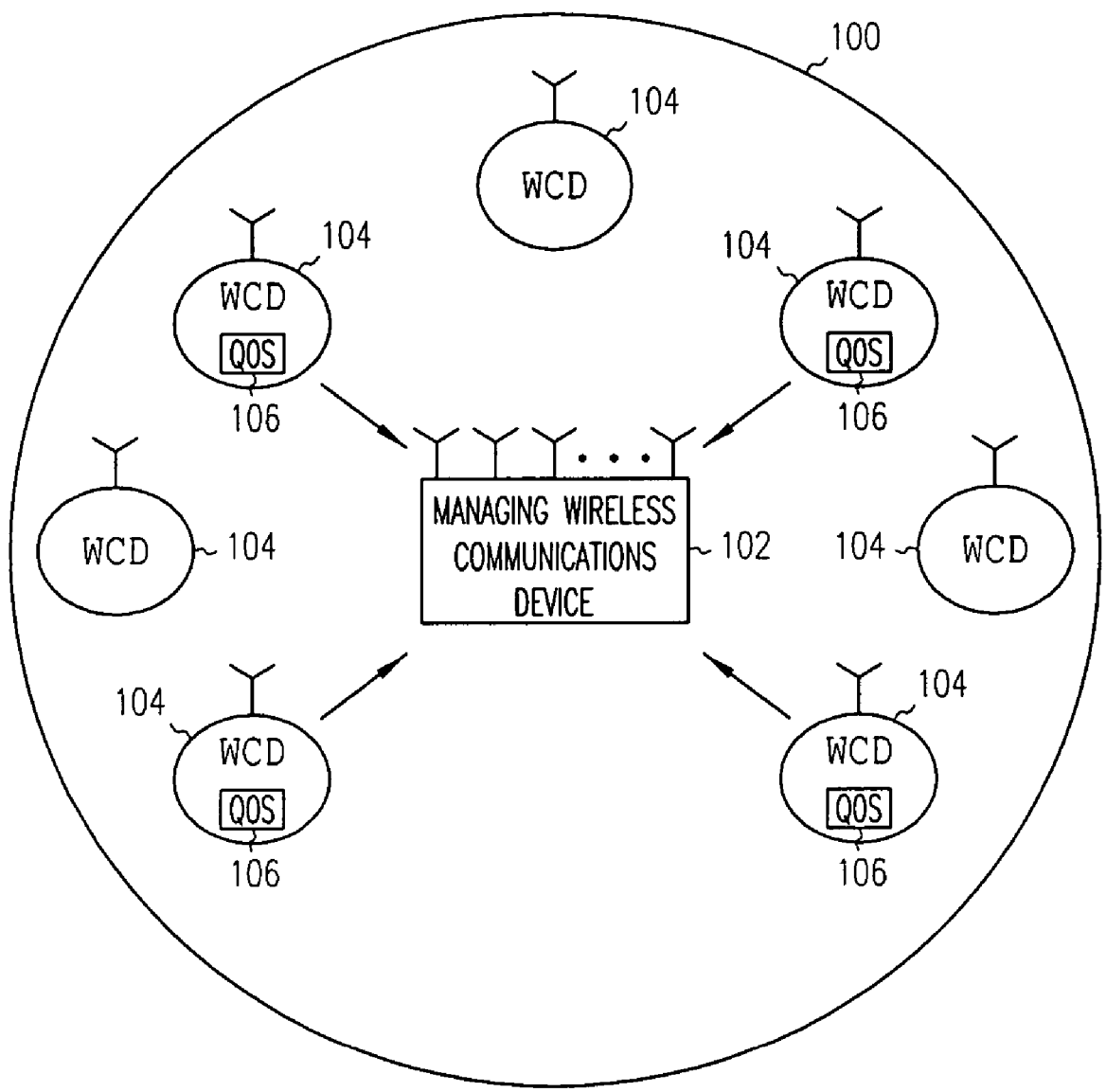
FIG. 1 illustrates a wireless network in accordance with some embodiments of the present invention.

FIG. 1 illustrates a wireless network in accordance with some embodiments of the present invention. Wireless network 100 comprises managing wireless communication device 102 and one or more of a plurality of associated wireless communication devices (WCDs) 104. Managing wireless communication device 102 may provide for communications between associated wireless communication devices 104 and may allow associated wireless communication devices 104 to communicate with one or more external networks, such as the internet.

In some embodiments, managing wireless communication device 102 may a wireless access point (AP), such as a Wireless Fidelity (WiFi), Worldwide Interoperability for Microwave Access (WiMax) or broadband communication station, although the scope of the invention is not limited in this respect as managing wireless communication device 102 may be almost any wireless communication device. In some embodiments, associated wireless communication devices 104 may be communication stations (STAs), such as WiFi, WiMax, or broadband communication stations, although the scope of the invention is not limited in this respect.

In accordance with some embodiments of the present invention, managing wireless communication device 102 employs a multi-user uplink with more than one of associated wireless communication devices 104. In these embodiments, latency may be reduced for applications 106 operating on selected associated wireless communication devices 104. The selection of certain associated wireless communication devices is discussed below. Applications 106 may include time-sensitive applications, such as voice over the internet protocol (VoIP) or streamed video applications, which may have time-sensitive packet transmission requirements. In some embodiments, applications 106 may include applications having quality-of-service (QOS) level requirements. Quality-of-service level requirements may include data rate requirements, error rate requirements and/or packet priority requirements. In some embodiments, the quality-of-service level requirements may be based on the information content of the communications. Applications 106 may also include less time-sensitive applications such applications that communicate best-effort traffic as well as background traffic. Although some embodiments of the present invention are described reducing latency for time-sensitive applications, the scope of the invention is not limited in this respect, as some embodiments are equally applicable to almost any communication application operating on a wireless communication device. In some embodiments, time-sensitive applications may refer to any communication application having a packet-latency requirement.

In some embodiments, power consumption of associated communications stations 104 may also be reduced. In some embodiments, managing wireless communication device 102 may substantially simultaneously receive uplink data through two or more receive antennas from two or more associated wireless communication devices 104 on the same frequency subcarriers of a multicarrier communication channel. In these embodiments, managing wireless communication device 102 may internally separate the uplink data transmitted by the two or more associated wireless communication devices 104 using channel estimates for each associated wireless communication device from which a transmission is received. In some embodiments, managing wireless communication device 102 may take advantage of the antenna diversity resulting from differently located associated wireless communication devices. These embodiments are discussed in more detail below.

Figure 2A:
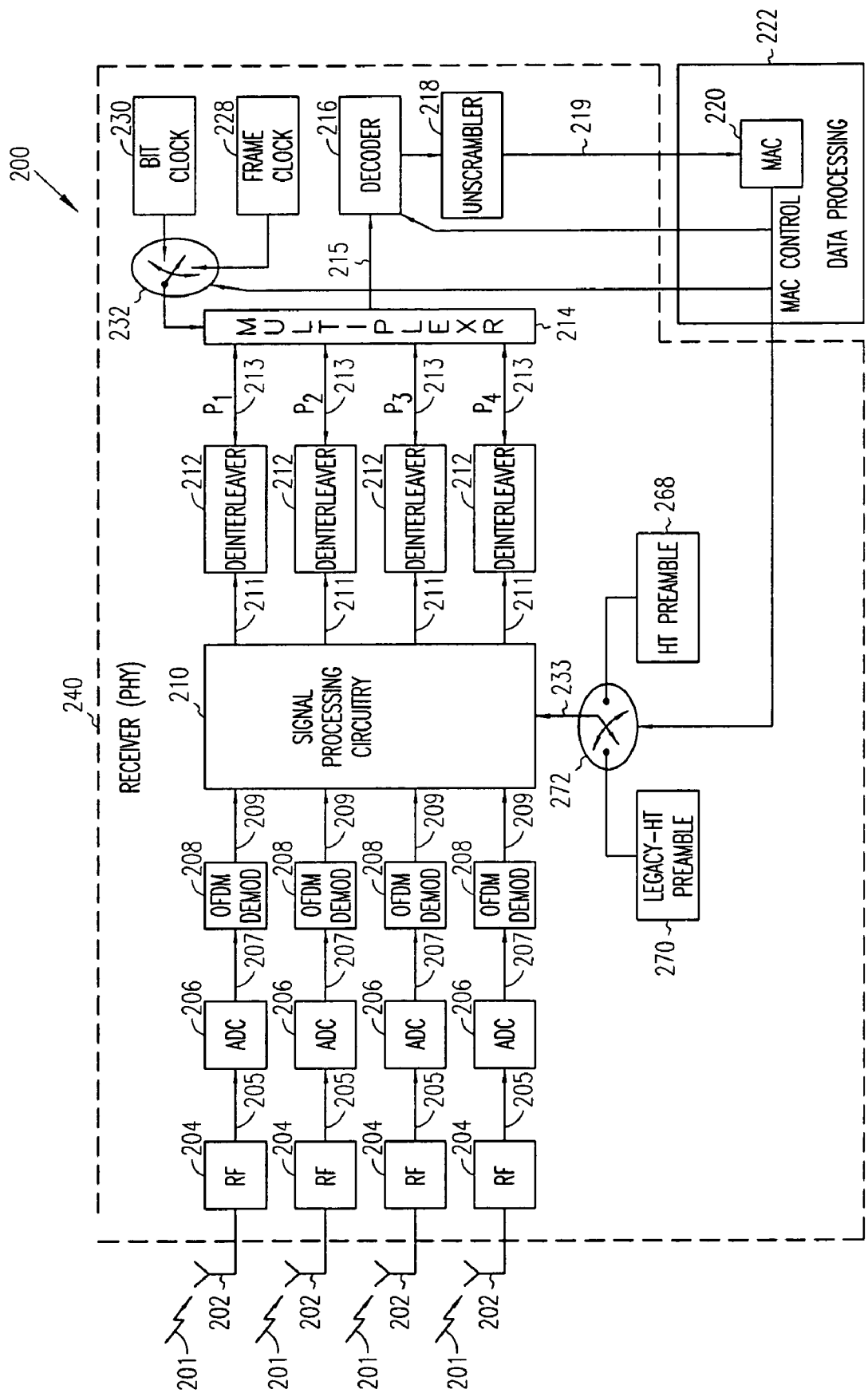
FIGS. 2A and 2B are block diagrams of receiver and transmitter portions of a managing wireless communication device in accordance with some embodiments of the present invention.
Figure 2B:
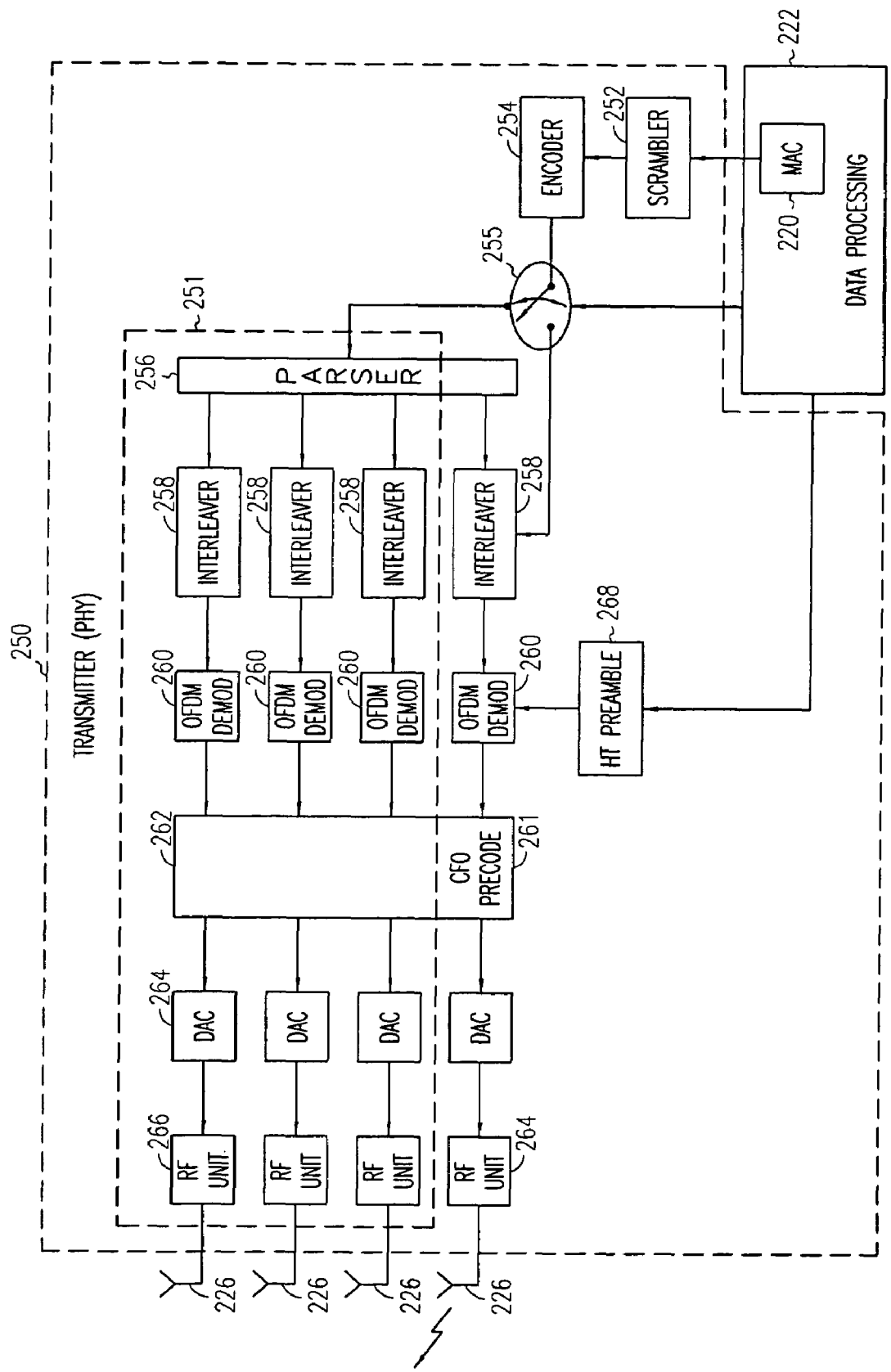

FIGS. 2A and 2B are block diagrams of receiver and transmitter portions of a managing wireless communication device in accordance with some embodiments of the present invention. Managing wireless communication device 200 may correspond to managing wireless communication device 102 (FIG. 1), although other configurations may also be suitable. Associated wireless communication devices 104 (FIG. 1) may be similarly configured, although the scope of the invention is not limited in this respect. Managing wireless communication device 200 may comprise receiver portion 240 illustrated in FIG. 2A and transmitter portion 250 illustrated in FIG. 2B. Receiver portion 240 may receive multicarrier communication signals 201, such as orthogonal frequency division multiplexed (OFDM) signals, and may generate physical (PHY) layer output data 219 for media access control (MAC) layer 220.

Receiver portion 240 may comprise a plurality of receive antennas 202 to receive communications from associated wireless communication devices 104 (FIG. 1), radio-frequency (RF) receiver circuitry 204 associated with each of antennas 202 to generate baseband signals 205, and analog-to-digital conversion (ADC) circuitry to generate digital signals 207 associated with each receive antenna 202.

Receiver portion 240 may also comprise demodulators 208 to generate demodulated signals 209. In some embodiments, the demodulated signals may be generated by performing Fourier transforms on digital signals 207 when the transmitting station generated the transmitted signals using an inverse Fourier transform, although the scope of the invention is not limited in this respect. In some of these embodiments, each of demodulated signals 209 may comprise a frequency-domain symbol modulated subcarrier for each subcarrier of received multicarrier communication signals 201, although the scope of the invention is not limited in this respect. In some embodiments, demodulators 208 may comprise OFDM demodulators, although the scope of the invention is not limited in this respect.

Receiver portion 240 may also comprise signal processing circuitry (SPC) 210 to perform carrier frequency offset (CFO) estimation and channel estimation based on preamble information 233. Signal processing circuitry 210 may also perform an equalization and may demap constellations (i.e., frequency-domain symbols 109 for each subcarrier) to generate bits 211.

Receiver portion 240 may also comprise deinterleavers 212 to perform deinterleaving operations on bits 211 and multiplexer 214 to multiplex the bits from deinterleavers 212 to generate frames 215 based on boundary information provided by bit clock 230 or frame clock 228. Receiver portion 240 may also comprise decoder 216 to decode frames 215, and unscrambler 218 to unscramble the decoded frames to generate PHY layer output data 219, although the scope of the invention is not limited in this respect.

In some embodiments, transmitter portion 250 (see FIG. 2B) of managing wireless communication device 200 may comprise scrambler 252 and encoder 254 for scrambling and/or encoding bits provided by MAC layer 220, and switching element 255 for providing the encoded bits either to parser 256 or to one of interleavers 258. In some embodiments, when transmitter portion 250 is transmitting with one antenna, such as when transmitting a downlink polling frame discussed below, switching element 255 may provide bits to one of interleavers 258. In some embodiments, when transmitter portion 250 is transmitting with all of transmit antennas 226, switching element 255 may provide bits to parser 256 for parsing or dispersing among interleavers 258.

Interleavers 258 may perform interleaving operations, such as block interleaving operations, on bits received from parser 256 and may provide blocks of bits to bit modulators 260. Modulators 260 may symbol-modulate the blocks of bits to generate symbol-modulated subcarriers for each subcarrier of a multicarrier communication channel. In some embodiments, modulators 260 may be OFDM modulators, although the scope of the invention is not limited in this respect. Digital-to-analog converter (DAC) circuitry 264 may generate analog signals for RF modulation by RF transmitter circuitry 266 for transmission by an associated one of transmit antennas 226.

Receiver portion 240 and transmitter portion 250 both may comprise data processing circuitry 222, which may include MAC layer 220, for performing some operations described in more detail below. In some embodiments, data processing circuitry 222 may determine a number of associated wireless communication devices 104 (FIG. 1) associated with managing wireless communication device 200 having time-sensitive applications 106 (FIG. 1) operating thereon. In these embodiments, data processing circuitry 222 may select a predetermined number of these associated wireless communication devices based on a number of receive antennas 202 available to receive communication signals from the selected associated wireless communication devices over a multi-user uplink discussed in more detail below. In some embodiments, the time-sensitive applications may include applications having QOS level requirements and may include VoIP as well as other applications having reduced packet latency requirements. In some embodiments, managing wireless communication device 200 may use up to four receive antennas 202 for receiving communication signals 201 from up to four associated wireless communication devices. In these embodiments, up to four of the associated wireless communication devices operating time-sensitive applications may be selected by data processing circuitry 222, although the scope of the invention is not limited in this respect. In other embodiments, more than four receive antennas 202 may be use to receive communications from up to an equal number of transmitting stations.

Although managing wireless communication device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of managing wireless communication device 200 may refer to one or more processes operating on one or more processing elements. Although managing wireless communication device 200 is illustrated as having four receive antennas 202 and associated receiver circuitry, the scope of the invention is equally suitable to wireless communication devices having as little as two receive antennas and up to ten or more receive antennas.

In some embodiments, managing wireless communication device 200 may be part of a wireless communication device that may transmit and/or receive OFDM communication signals over a multicarrier communication channel. The multicarrier communication channel may be within a predetermined frequency spectrum and may comprise a plurality of orthogonal subcarriers. In some embodiments, the orthogonal subcarriers may be closely spaced OFDM subcarriers. To help achieve orthogonality between the closely spaced subcarriers, each subcarrier may have a null at substantially a center frequency of the other subcarriers. In some embodiments, to help achieve orthogonality between the closely spaced subcarriers, each subcarrier may have an integer number of cycles within a symbol period, although the scope of the invention is not limited in this respect.

In some embodiments, the frequency spectrums for the multicarrier communication signals communicated between managing wireless communication device 102 (FIG. 1) and associated wireless communication devices 104 (FIG. 1) may comprise either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some broadband and WiMax embodiments, the frequency spectrum for communications may comprise frequencies between 2 and 11 GHz, although the scope of the invention is not limited in this respect.

In some embodiments, managing wireless communication device 102 (FIG. 1) and associated wireless communication devices 104 (FIG. 1) may transmit and/or receive RF communications in accordance with specific communication standards, such as the Institute of Electrical and Electronics Engineers (IEEE) standards including IEEE 802.11(a), 802.11(b), 802.11(g), 802.11(h) and/or 802.11(n) standards for wireless local area networks (WLANs), although these wireless communication devices may also be suitable to transmit and/or receive communications in accordance with other techniques. In some broadband and WiMax embodiments, managing wireless communication device 102 (FIG. 1) and associated wireless communication devices 104 (FIG. 1) may transmit broadband wireless communications in accordance with the IEEE 802.16(e) standards for wireless metropolitan area networks (WMANs), although the scope of the invention is not limited in this respect. For more information with respect to the IEEE 802.11 standards, please refer to "IEEE Standards for Information Technology—Telecommunications and Information Exchange between Systems—Local and Metropolitan Area Network—Specific Requirements—Part 11: Wireless LAN Medium Access Control (MAC) and Physical Layer (PHY), ISO/IEC 8802-11: 1999" and related amendments/versions.

In some embodiments, managing wireless communication device 102 (FIG. 1) and/or any one or more of associated wireless communication devices 104 (FIG. 1) may be part of a portable wireless communication device, such as personal digital assistant (PDA), a laptop or portable computer with wireless communication capability, a web tablet, a wireless telephone, a wireless headset, a pager, an instant messaging device, a digital camera, a television or other device that may receive and/or transmit information wirelessly.

Antennas 202 and antennas 226 may comprise directional or omnidirectional antennas, including, for example, dipole antennas, monopole antennas, patch antennas, loop antennas, microstrip antennas or other types of antennas suitable for reception and/or transmission of RF signals.

FIG. 3A is a diagram illustrating some communications between a managing wireless communication device and associated wireless communication devices. FIG. 3B is a diagram illustrating communications between a managing wireless communication device and associated wireless communication devices in accordance with some embodiments of the present invention. FIGS. 3A and 3B illustrate the communications between a managing wireless communication device and four associated wireless communication devices. In FIG. 3A, a multi-user downlink and single-user uplinks are illustrated. In FIG. 3B, a multi-user downlink and a multi-user uplink are illustrated for an example of four uploading stations, although the scope of the invention is not limited in this respect. Embodiments of the present invention are equally suitable for use with a greater number of uploading stations.

In FIG. 3A, a managing wireless communication device transmits downlink polling frame 322 to the first wireless communication device, and subsequently receives uplink preamble and data 324 from the first wireless communication device. Managing wireless communication device then transmits downlink polling frame 326 to the second wireless communication device, and subsequently receives uplink preamble and data 328 from the second wireless communication device. As illustrated, the polling frames may include both polling information for a wireless communication device and acknowledgement information. The managing wireless communication device then transmits downlink polling frame 330 to the third wireless communication device, and subsequently receives uplink preamble and data 332 from the third wireless communication device. Managing wireless communication device then transmits downlink polling frame 334 to the fourth wireless communication device, and subsequently receives uplink preamble and data 336 from the fourth wireless communication device. As illustrated, downlink polling frame 326 may include an acknowledge (ACK) frame for the first wireless communication device, downlink polling frame 330 may include an ACK frame for the second wireless communication device, downlink polling frame 334 may include an ACK frame for the third wireless communication device.

Referring to FIG. 3B, in accordance with some embodiments of the present invention, managing wireless communication device 102 (FIG. 1) may transmit downlink polling frame 302 to four associated wireless communication devices, receive uplink preamble 304 and uplink data 306 from the four associated wireless communication devices, and may transmit acknowledge frame 308 to the four associated wireless communication devices. As illustrated, latency may be reduced by up to a factor of four in this example illustrating communications with four uplinking stations.

Referring to FIGS. 2A, 2B and 3B, in accordance with some embodiments of the present invention, RF transmitter circuitry 224 may transmit downlink polling frame 302 addressed to selected associated wireless communication devices. Downlink polling frame 302 may indicate to each selected associated wireless communication device, which communication parameters to use in subsequent transmission of uplink headers 304 by the selected associated wireless communication devices. The communication parameters may identify a preamble sequence and a set of subcarriers for each selected associated wireless communication device to use. In these embodiments, RF receiver circuitry 204 may receive uplink headers 304 from each selected associated wireless communication device on different subcarriers of a multicommunication channel through receive antennas 202. In these embodiments, RF receiver circuitry 204 may receive uplink data 306 substantially simultaneously from each of selected associated wireless communication devices on most or all data subcarriers of the multicarrier communication channel through receive antennas 202. Signal processing circuitry 210 may separate uplink data 306 received for each of the selected associated wireless communication devices based on channel estimates previously generated from the received uplink headers 304.

In some embodiments, each selected associated wireless communication device may transmit uplink data 306 using the same frequency subcarriers, which may comprise substantially most or all data subcarriers of the multicarrier communication channel. Even though wireless communication devices may use the same (i.e., interfering/overlapping) frequency subcarriers of the multicarrier communication channel, through antenna diversity and use of channel estimates, managing wireless communication device 200 may be able to sufficiently separate out their different data transmissions. This is described in more detail below.

In accordance with some embodiments, the number of the receive antennas 202 used by managing wireless communication device 102 (FIG. 1) to receive uplink data 306 may be at least as great as the number of selected associated wireless communication devices 104 (FIG. 1). In these embodiments, RF receiver circuitry 204 may generate received time-domain baseband signals (i.e. signals 205) associated with each of receive antennas 202 for subsequent processing by signal processing circuitry 210.

In some embodiments, the substantially simultaneous receipt of uplink headers 304 and uplink data 306 over a multi-user uplink from the selected associated wireless communication devices may reduce latency by up to about four times (as illustrated by FIGS. 3A and 3B) and may increase uplink capacity by about four times when managing wireless communication device 200 uses four receive antennas 202 for reception. In some embodiments, uplink headers 304 may be transmitted after time delay 310.

In some WiFi and some wireless local area network WLAN embodiments, managing wireless communication device 200 may be a WLAN access point and may use up to four or more of receive antennas 202 to receive uplink data 306 from selected WiFi wireless communication stations, although the scope of the invention is not limited in this respect. In some WiMax and some wireless metropolitan area WMAN embodiments, managing wireless communication device 200 may be a broadband wireless access point or access station and may use many use up to ten or more of receive antennas 202 to receive uplink data 306 from selected broadband communication stations, although the scope of the invention is not limited in this respect.

In some embodiments, RF receiver circuitry 204 receives uplink headers 304 from each of the selected associated wireless communication devices through the plurality of receive antennas 202. In these embodiments, uplink headers 304 may have been transmitted substantially simultaneously by each of the selected associated wireless communication devices in accordance with the associated communication parameters indicated by downlink polling frame 302 to allow managing wireless communication device 200 to uniquely identify or associate one of the received uplink headers 304 with a selected associated wireless communication device for performing channel estimates, among other things.

Figure 4A:
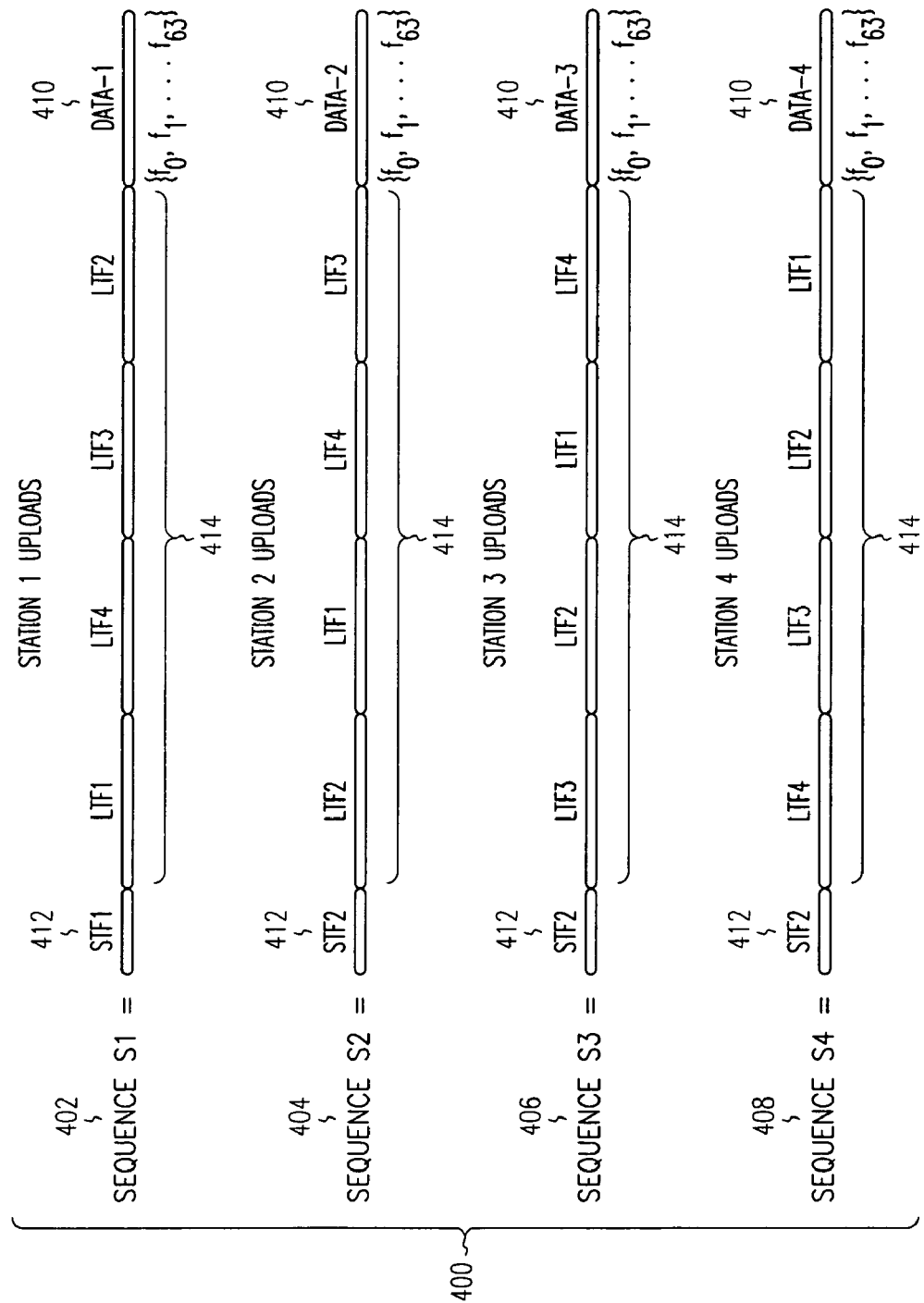

FIGS. 4A and 4B illustrate uplink transmissions 400 by four transmitting stations in accordance with embodiments of the present invention. The transmitting stations may correspond to four selected associated wireless communication devices 104 (FIG. 1) that may communicate over a multi-user uplink with an access point or managing communication device 102 (FIG. 1). Transmissions 402 may be transmitted by a first transmitting station (i.e., station 1) and may comprise sequence S1, transmissions 404 may be transmitted by a second transmitting station (i.e., station 2) and may comprise sequence S2, transmissions 406 may be transmitted by a third transmitting station (i.e., station 3) and may comprise sequence S3, and transmissions 408 may be transmitted by a forth transmitting station (i.e., station 4) and may comprise sequence S4.

Each station may transmit short training field 412, illustrated as STF1, STF2, STF3 and STF4, following by long training field 414. Long training field 414 comprises a plurality of frequency interleaved training fields 416, 418, 420 and 422 illustrated in FIG. 4B as LTF1, LTF2, LTF3 and LTF4. As shown in FIG. 4B, each of frequency interleaved training fields 416, 418,420 and 422 comprise a set of frequency-interleaved subcarriers, which in this example, comprise frequency subcarriers between 0 and 63, although the scope of the invention is not limited in this respect. In this way LTF1 416 may be transmitted in subcarriers 417, LTF2 418 may be transmitted in subcarriers 419, LTF3 420 may be transmitted in subcarriers 421 and LTF4 422 may be transmitted in subcarriers 423. In some embodiments, the subcarriers of long training field 414 may comprise sets of orthogonal subcarriers 417, 419, 421 and 423 illustrated in FIG. 4B. In some embodiments, short training field 412 may also comprise sets of orthogonal subcarriers 417, 419, 421 and 423 illustrated in FIG. 4B, although the scope of the invention is not limited in this respect.

FIG. 4A also illustrates the transmission of data field 410 by each of the transmitting stations. In these example embodiments, all four transmitting stations may transmit their data simultaneously during data field 410 on the same frequency subcarriers. For example, as illustrated, station 1 may transmit data-1 on frequency subcarriers $f_0, f_1, f_2 \ldots f_{63}$ at the same time station 2 transmits data-2 on frequency subcarriers $f_0, f_1, f_2 \ldots f_{63}$, at the same time station 3 transmits data-3 on frequency subcarriers $f_0, f_1, f_2 \ldots f_{63}$, and at the same time station 4 transmits data-4 on frequency subcarriers $f_0, f_1, f_2 \ldots f_{63}$. Although FIGS. 4A and 4B illustrate example embodiments that use 64 subcarrier frequencies, the scope of the invention is not limited in this respect. In some embodiments, up to several hundred or more subcarrier frequencies may be used. Although FIGS. 4A and 4B illustrate example embodiments of four transmitting stations simultaneously uplinking to an access point, the scope of the invention is not limited in this respect as up to ten or more transmitting stations may be configured to transmit to an access point over a multi-user uplink.

In FIG. 4A, uplink short training fields 412 and uplink long training fields 414 may correspond to uplink headers 304 (FIG. 3), and uplink data fields 410 may correspond to uplink data 306 (FIG. 2).

Referring to FIGS. 3, 4A and 4B together, in some embodiments, polling frame 302 may be transmitted with a single transmit antenna by station 102 (FIG. 1). In these embodiments, polling frame 302 may by similar to a conventional or legacy packet format, however the single polling station address may be replace with up to four or more polling station addresses indicating that these stations are being polled, and also indicating that these polled stations are to simultaneous uplink packets by using sequences S1, S2, S3 and S4 (for the example of four stations). The sequences may correspond to the polling station addresses in polling frame 302. In these embodiments, the polling frame may be similar to a legacy polling frame with multi-station addresses.

In some alternate embodiments, polling frame 302 may use field-bits or another technique to indicate the addresses and/or a set of subcarriers of a plurality of subcarriers of the multicarrier communication channel for each selected associated wireless communication device to use for transmission of an associated one of uplink headers 304. In some embodiments, subcarriers 416, 418, 420 and 422 may be unique to each of the selected associated wireless communication devices and may be a set or group of subcarriers of an OFDM communication channel, although the scope of the invention is not limited in this respect. In some embodiments, uplink headers 304 may comprise physical-layer convergence protocol (PLCP) headers 304 and may include one or more training sequences. In some embodiments, signal processing circuitry 210 (FIG. 2A) may generate a channel estimate for each of the selected associated wireless communication devices from the received uplink headers 304 based on sequences in training fields 412 and 414 received from with each of the selected associated wireless communication devices. In some embodiments, training fields 412 and 414 may comprise one or more known training sequences which may include short and/or long training sequences, although the scope of the invention is not limited in this respect.

After receipt of uplink headers 304 and uplink data 306, managing wireless communication device may transmit acknowledge (ACK) frame 308. Acknowledge frame 308 may include a bit-pattern that indicates ACKs for each uploading station rather than for a single station. For example, a bit pattern of "1111" in acknowledge frame 308 may indicate acknowledgements to all stations, a bit patter of "1011" may indicate acknowledgements to a first, a third and a fourth station, and not to a second station. A bit pattern of "0000" in acknowledge frame 308 may indicate no acknowledgement to all four uplinking stations. In some embodiments, managing station 102 (FIG. 1) may transmit acknowledgement frame 308 using a single antenna to conserve power, although the scope of the invention is not limited in this respect.

In some embodiments, for the simultaneous uploading by more than one transmitting station, each station may transmit a unique header for use by the managing station for channel estimation, carrier frequency estimating and automatic gain control. In these embodiments, the unique header may comprise a subset of subcarrier frequencies of an OFDM symbol. For the data portion, on the other hand, each transmitting station may use all data subcarriers for data carrying. In these embodiments, the headers transmitted by each uplinking station may be orthogonal to each other and comprise orthogonal subcarriers.

In some embodiments, uplink headers 304 and uplink data 306 may comprise a single multi-user uplink frame, although the scope of the invention is not limited in this respect. In some embodiments, the channel estimate for each selected associated wireless communication device may comprise a channel vector, and in other embodiments, the channel estimates may comprise an estimate of the channel transfer function of the channel between a managing wireless communication device and each of the selected associated wireless communication devices, although the scope of the present invention is not limited in this respect. In some embodiments, signal processing circuitry 210 (FIG. 2A) may generate a channel estimate for each subcarrier of the multicarrier communication channel based on the subcarriers that uplink headers 304 are received on. In some embodiments, the channel estimates may be applied by signal processing circuitry 210 (FIG. 2A) in the frequency domain, although the scope of the invention is not limited in this respect.

In some embodiments, managing wireless communication device 200 transmits downlink polling frame 302 using a single one of the transmit antennas 226. In some embodiments, managing wireless communication device 200 may have up to four or more transmit antennas 224, but uses only one of the antennas for transmitting the downlink polling frame.

When transmitting downlink polling frame 302 and acknowledge frame 308, data processing circuitry 222 (FIG. 2B) may provide multi-user uplink preamble 268 (FIG. 2B) to one of modulators 260 (FIG. 2B), which may modulate the preamble for precoding by precoder 261 (FIG. 2B) and subsequent transmission by one of transmit antennas 226 (FIG. 2B). In these embodiments, data processing circuitry 222 (FIG. 2B) may control switching element 255 (FIG. 2B) to switch-off unused portions 251 (FIG. 2B) of transmitter portion 250 (FIG. 2B). In the embodiments illustrated in FIG. 2B, all but one signal path is switched off, although the scope of the invention is not limited in this respect. In some embodiments, multi-user uplink preamble 268 may be a high-throughput preamble. Preamble 268 may comprise one or more known training sequences.

When receiving uplink headers 304 and uplink data 306 (e.g., in a multi-user uplink mode), data processing circuitry 222 (FIG. 2A) may control switching element 272 (FIG. 2A) to provide multi-user uplink preamble 268 (FIG. 2A) to signal processing circuitry 210 (FIG. 2A) for processing received uplink headers 304. When receiving in a single-user uplink mode, such as the single user uplink mode illustrated in FIG. 3A, data processing circuitry 222 (FIG. 2A) may control switching element 272 (FIG. 2A) to provide legacy preamble 270 (FIG. 2A) to signal processing circuitry 210 (FIG. 2A) to receive communications in a single user uplink mode.

In some embodiments, uplink headers 304 and uplink data 306 may be transmitted by each of the selected associated wireless communication devices using a single transmit antenna. This may allow associated wireless communication devices 104 (FIG. 1) to reduce energy consumption while reducing latency of applications 106 (FIG. 1). This may be helpful especially for associated wireless communication devices 104 (FIG. 1) that are battery-powered and/or portable.

In some embodiments, uplink headers 304 and uplink data 306 transmitted by selected associated wireless communication devices together comprise an OFDM symbol, although the scope of the invention is not limited in this respect. In some embodiments, time-differences between receipt of uplink headers 304 and uplink data 306 from different of the selected associated wireless communication devices is less than a length of a cyclic prefix of an OFDM symbol. In this way, a managing wireless communication device may be able to process the transmissions of the different wireless communication devices as a single OFDM symbol, although the scope of the invention is not limited in this respect. In some embodiments, the length of the cyclic prefix may be greater than or equal to the sum of the channel spread, the inter-packet delay and any delay associated with the interface between MAC layer 220 and the physical (PHY) layer elements illustrated in FIGS. 2A and 2B. In some embodiments, interference caused by the delay exceeding the cyclic prefix may be compensated by additional time-domain equalization techniques, such as decision feedback equalization (DFE) techniques.

In some embodiments, after separating uplink data 306 associated with the selected associated wireless communication devices, signal processing circuitry 210 (FIG. 2A) may generate separated data 211 (FIG. 2A) corresponding to uplink data 306 transmitted by each of the selected associated wireless communication devices. After deinterleaving, separated data 213 (FIG. 2A) may comprise packets $P_1$, $P_2$, $P_3$ and $P_4$ corresponding, respectively, to packets transmitted respectively by four selected associated wireless communication devices 104 (FIG. 1), although the scope of the invention is not limited in this respect.

Referring to FIG. 2A, in some embodiments, multiplexer 214 may multiplex separated data 213 generated by signal processing circuitry 210, and frame clock 228 may provide frame boundaries to the multiplexer 214 to sequentially select frames of separated data 213 from signal processing circuitry 210 associated with each selected associated wireless communication device 104 for subsequent decoding by decoder 216 and/or unscrambling by unscrambler 218.

In some embodiments, bit clock 230 may provide bit boundaries to the multiplexer when signal processing circuitry 210 generates data received from a single associated selected wireless communication device. Switching element 232 may selectively couple either bit clock 230 or frame clock 228 with the multiplexer. Frame clock 228 may be coupled when uplink data 306 is being received substantially simultaneously from two or more selected associated wireless communication devices while bit clock 230 may be coupled when uplink data is being received at different times from wireless communication devices (i.e., when communicating in a standard mode).

Figure 5:
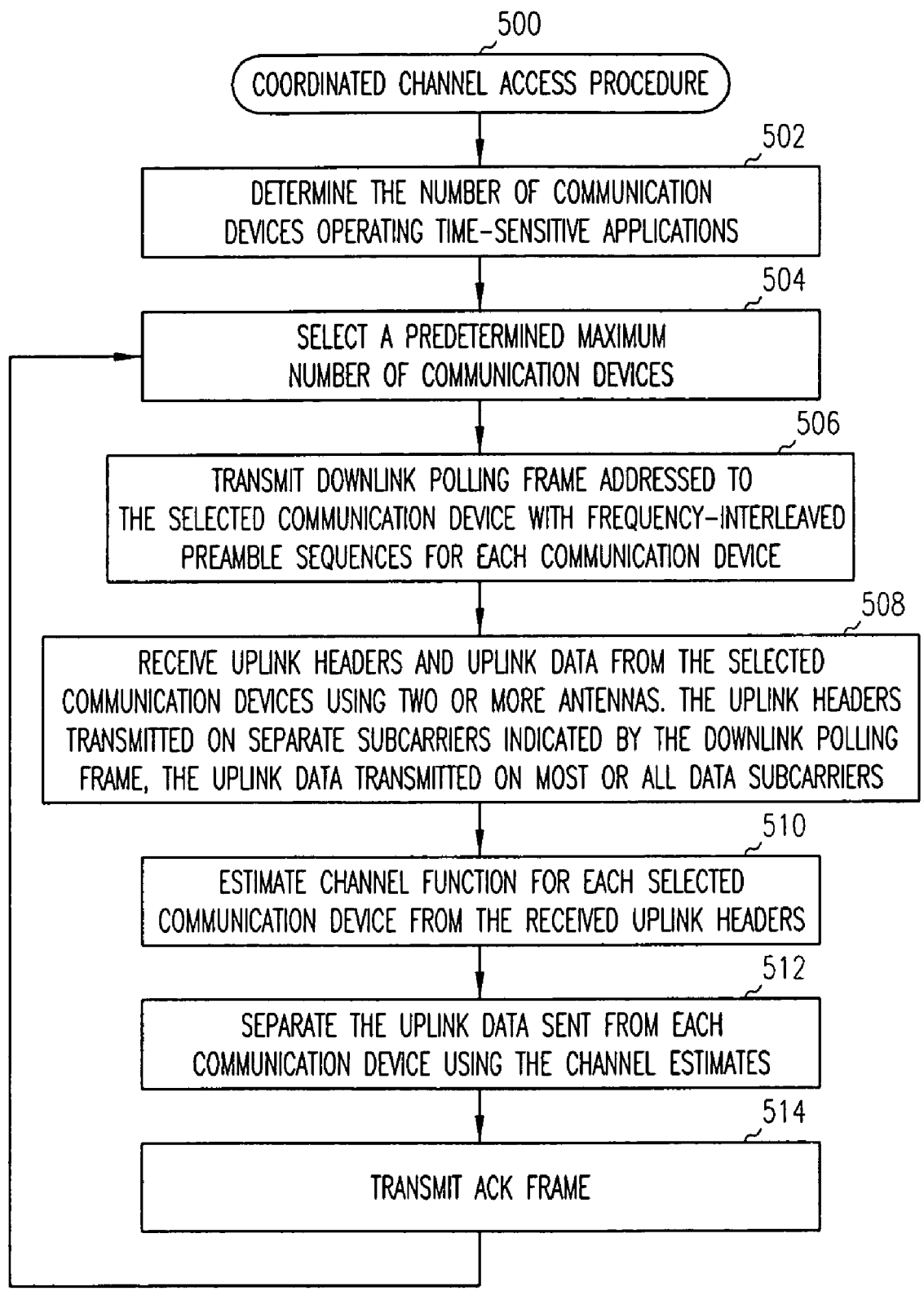
FIG. 5 is a flow chart of a coordinated channel access procedure in accordance with some embodiments of the present invention.

FIG. 5 is a flow chart of a coordinated channel access procedure in accordance with some embodiments of the present invention. Coordinated channel access procedure 500 may be performed by a managing wireless communication device, such as managing wireless communication device 200 (FIGS. 2A and 2B), although other managing wireless communication devices may also be used to perform procedure 500.

Operation 502 comprises determining the number of wireless communication devices operating time-sensitive applications. In some embodiments, operation 502 may be performed by data processing circuitry 222 (FIG. 1).

Operation 504 comprises selecting a number of wireless communication devices operating time-sensitive applications from the number determined in operation 502. In some embodiments, the number of associated wireless communication devices selected in operation 504 may be equal to the number of receive antennas used by the managing wireless communication device to receive uplink data. In some embodiments, operation 504 may be performed by data processing circuitry 222 (FIG. 1).

Operation 506 comprises transmitting a downlink polling frame addressed to the associated wireless communication devices selected in operation 504. In some embodiments, the downlink polling frame may comprise frequency interleaved preamble sequences for each selected associated wireless communication device and may correspond to polling frame 302 (FIG. 3). The downlink polling frame may be generated by MAC layer 220 of data processing circuitry 222 (FIG. 1) and may be transmitted by one of transmit antennas 226 (FIG. 2B).

Operation 508 comprises receiving uplink headers and uplink data from the selected associated wireless communication devices using a number of receive antennas that is at least as great as the number of selected associated wireless communication devices that the uplink headers and uplink data is received from. In some embodiments, when the managing wireless communication device is an access point or access station, the number of receive antennas used by the access point or access station may be equal or greater than the number of selected associated wireless communication stations simultaneously transmitting in the uplink. Each of the selected associated wireless communication devices may have substantially simultaneously transmitted their uplink header on certain subcarriers based on information provided by the downlink polling frame. The selected associated wireless communication devices may have also substantially simultaneously transmitted their uplink data on most or all subcarriers.

Operation 510 comprises estimating the channel between the managing wireless communication device and each of the selected associated wireless communication devices. Operation 510 may be performed based on the uplink headers received from each selected wireless communication device on the certain subcarriers. In some embodiments, operation 510 may be performed by a channel estimation portion of signal processing circuitry 210.

Operation 512 comprises separating the uplink data received from the selected associated wireless communication devices based on the channel estimates generated in operation 510.

After operation 512, the managing wireless communication device may transmit an acknowledge frame, such as acknowledge frame 308 (FIG. 3B), in operation 514 to acknowledge successful receipt of uplink data from each of the selected associated wireless communication devices. Managing wireless communication device may also repeat operations 504 through 514 for any additional associated wireless communication devices that have currently operating time-sensitive applications that were not selected in operation 504.

Although the individual operations of procedure 500 are illustrated and described as separate operations, one or more of the individual operations may be performed concurrently, and nothing requires that the operations be performed in the order illustrated.

Figure 6A:
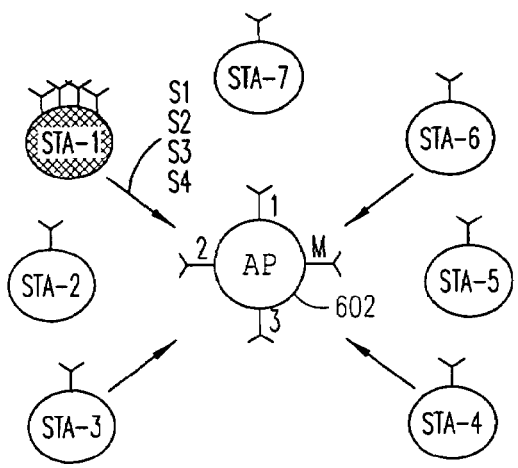
FIGS. 6A-6D illustrate examples of communications between an access point and communication station in accordance with some embodiments of the present invention.
Figure 6B:
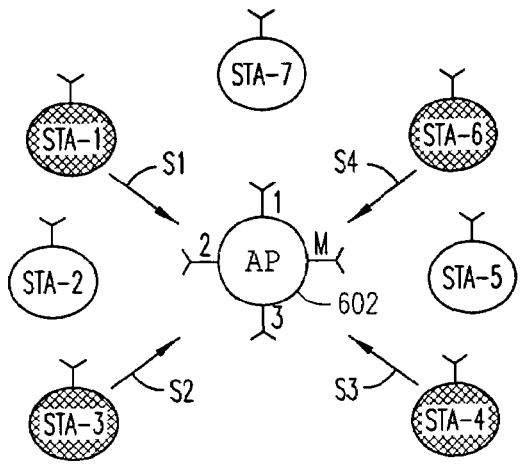
Figure 6C:
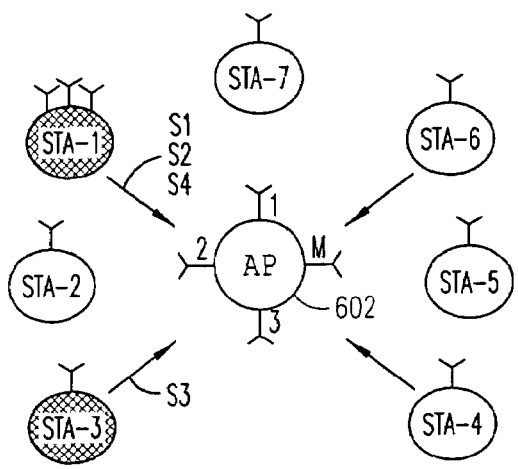
Figure 6D:
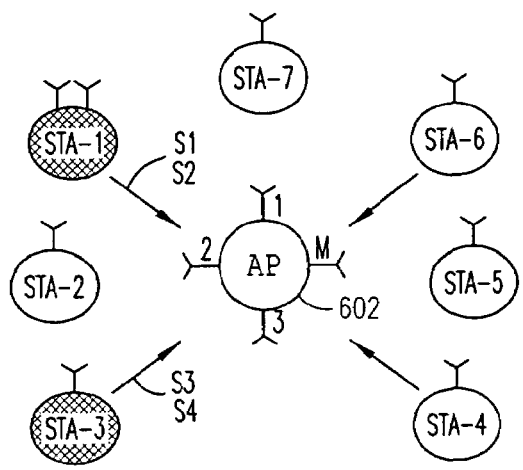

FIGS. 6A-6D illustrate examples of communications between an access point and communication station in accordance with some embodiments of the present invention. Access point 602 may correspond to managing communication 102 (FIG. 1) and the communications stations (STAs) may correspond to communication stations 104 (FIG. 1). In FIG. 6A, access point 602 receives transmissions from a single transmitting station (i.e., station 1) using all four sequences (S1, S2, S3 and S4). In this example, the transmissions may have a data rate of 216 megabits per second (Mbps). In FIG. 6B, access point 602 receives transmissions from four transmitting station (i.e., stations 1, 2, 3 and 4). In this example, each transmitting station uses one of the sequences (S1, S2, S3 or S4). In this example, the transmission by each station may have a data rate of 54 Mbps. In FIG. 6C, access point 602 receives transmissions from two transmitting station (i.e., stations 1 and 3). In this example, each transmitting station uses one or more sequences. As illustrated, station 1 uses three sequences (S1, S2 and S4) and station 3 uses one sequence (e.g., S3). In this example, station 1 transmissions may have a data rate of 162 Mbps and station 3 transmission may have a data rate of 54 Mbps. In FIG. 6D, access point 602 receives transmissions from two transmitting station (i.e., stations 1 and 3). In this example, each transmitting station uses two of the sequences. As illustrated, station 1 uses two sequences (S1 and S2) and station 3 uses two sequences S3 and S4) allowing each station (station 1 and 3) to transmit at uplink data rates of 108 Mbps.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features may be occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A managing wireless communication device comprising:
   transmitter circuitry to transmit a single downlink polling frame addressed to selected associated wireless communication devices having time-sensitive applications operating thereon, the downlink polling frame to indicate to each selected associated wireless communication device communication parameters for use in subsequent transmission of uplink headers; and
   signal processing circuitry to separate uplink data received simultaneously from each of the selected associated wireless communication devices based on channel estimates generated from the uplink headers.

2. The wireless communication device of claim 1 further comprising a plurality of transmit antennas coupled with the transmitter circuitry,
   wherein the wireless communication device transmits the downlink polling frame using a single one of the transmit antennas.

3. The wireless communication device of claim 2 wherein the uplink headers and the uplink data are transmitted by each of the selected associated wireless communication devices using a single transmit antenna.

4. A managing wireless communication device comprising:
   transmitter circuitry to transmit a downlink polling frame addressed to selected associated wireless communication devices, the downlink polling frame to indicate to each selected associated wireless communication device communication parameters for use in subsequent transmission of uplink headers;
   signal processing circuitry to separate uplink data received simultaneously from each of the selected associated wireless communication devices based on channel estimates generated from the uplink headers; and
   receiver circuitry to receive uplink data substantially simultaneously from the selected associated wireless communication devices on data subcarriers of a multicarrier communication channel through a plurality of receive antennas,
   wherein the number of the receive antennas used to receive the uplink data is at least as great as a number of the selected associated wireless communication devices, and
   wherein the receiver circuitry generates received signals associated with each of the receive antennas for subsequent processing by signal processing circuitry.

5. The wireless communication device of claim 4 wherein the receiver circuitry receives the uplink headers from each of the selected associated wireless communication devices through the plurality of receive antennas, the uplink headers being transmitted substantially simultaneously by each of the selected associated wireless communication devices in accordance with the associated communication parameters to allow the wireless communication device to uniquely identify one of the received uplink headers with the selected associated wireless communication devices.

6. The wireless communication device of claim 5 wherein each wireless communication device has an address associated therewith,
   wherein the downlink polling frame comprises a preamble sequence associated with each address of the selected associated wireless communication devices,
   wherein each of the preamble sequences associated with a set of subcarriers of the multicarrier communication channel, and
   wherein the selected associated wireless communication devices substantially simultaneously transmit the uplink headers in accordance with their associated preamble sequence and associated set of subcarriers.

7. The wireless communication device of claim 6 wherein the signal processing circuitry generates a channel estimate for each of the selected associated wireless communication devices from the received uplink headers based on the preamble sequence and subcarriers associated with each of the selected associated wireless communication devices.

8. The wireless communication device of claim 5 wherein time-differences between receipt of the uplink headers and the uplink data from different of the selected associated wireless communication devices is less than a length of a cyclic prefix of a symbol.

9. The wireless communication device of claim 4 further comprising data processing circuitry to determine a number of wireless communication devices associated with the wireless communication device having time-sensitive applications operating thereon, the data processing circuitry to select a predetermined number of the wireless communication devices based on a number of receive antennas available to receive communication signals from the wireless communication devices.

10. The wireless communication device of claim 9 wherein the managing communication device comprises either an access point operating in a wireless local area network or a broadband wireless communication device operating in a wireless metropolitan area network,
    wherein when the managing wireless communication device comprises the access point, the number of the receive antennas comprises at least two, and wherein when the managing wireless communication device comprises the broadband wireless communication device, the number of the receive antennas is at least four.

11. The wireless communication device of claim 4 wherein after separating the uplink data associated with the selected associated wireless communication devices, the signal processing circuitry generates separated data corresponding to the uplink data transmitted by each of the selected associated wireless communication devices, and wherein the wireless communication device further comprises:
a multiplexer to multiplex the separated data generated by signal processing circuitry; and
a frame clock to provide frame boundaries to the multiplexer to select frames of the separated data from the signal processing circuitry associated with each wireless communication device for subsequent decoding.

12. The wireless communication device of claim 11 further comprising:
a bit clock to provide bit boundaries to the multiplexer when the signal processing circuitry generates data received from a single wireless communication device; and
a switching element to selectively couple either the bit clock or the frame clock with the multiplexer, the frame clock being coupled when the uplink data is being received substantially simultaneously from the selected associated wireless communication devices, the bit clock being coupled when uplink data is being received at different times from selected associated wireless communication devices.

13. A method of communicating with a plurality of wireless communication devices comprising:
transmitting a single downlink polling frame addressed to selected ones of the wireless communication devices having time-sensitive applications operating thereon, the downlink polling frame to indicate to each selected associated wireless communication device communication parameters for use in subsequently transmitting uplink headers;
receiving uplink data substantially simultaneously from the selected associated wireless communication devices on data subcarriers of a multicarrier communication channel through a plurality of receive antennas; and
separating the uplink data received for each of the selected associated wireless communication devices based on channel estimates generated from the uplink headers.

14. A method of communicating with a plurality of wireless communication devices comprising:
transmitting a downlink polling frame addressed to selected ones of the wireless communication devices, the downlink polling frame to indicate to each selected associated wireless communication device communication parameters for use in subsequently transmitting uplink headers;
receiving uplink data substantially simultaneously from the selected associated wireless communication devices on data subcarriers of a multicarrier communication channel through a plurality of receive antennas; and
separating the uplink data received for each of the selected associated wireless communication devices based on channel estimates generated from the uplink headers,
wherein a number of the receive antennas used to receive the uplink data is at least as great as a number of the selected associated wireless communication devices, and wherein the method further comprises generating received signals associated with each of the receive antennas from the received uplink data for subsequent processing using the channel estimates.

15. A method of communicating with a plurality of wireless communication devices comprising:
transmitting a downlink polling frame addressed to selected ones of the wireless communication devices, the downlink polling frame to indicate to each selected associated wireless communication device communication parameters for use in subsequently transmitting uplink headers;
receiving uplink data substantially simultaneously from the selected associated wireless communication devices on data subcarriers of a multicarrier communication channel through a plurality of receive antennas;
separating the uplink data received for each of the selected associated wireless communication devices based on channel estimates generated from the uplink headers; and
receiving the uplink headers from each of the selected associated wireless communication devices through the plurality of receive antennas, the uplink headers being transmitted substantially simultaneously by each of the selected associated wireless communication devices in accordance with the associated communication parameters to allow a receiving wireless communication device to uniquely identify one of the received uplink headers with the selected associated wireless communication devices.

16. The method of claim 15 wherein each wireless communication device has an address associated therewith,
wherein the downlink polling frame comprises a preamble sequence associated with each address of the selected associated wireless communication devices,
wherein each of the preamble sequences associated with a set of subcarriers of the multicarrier communication channel,
wherein the selected associated wireless communication devices substantially simultaneously transmit the uplink headers in accordance with their associated preamble sequence and associated set of subcarriers.

17. The method of claim 16 further comprising generating a channel estimate for each of the selected associated wireless communication devices from the received uplink headers based on the preamble sequence and subcarriers associated with each of the selected associated wireless communication devices.

18. The method of claim 15 wherein time-differences between receipt of the uplink headers and the uplink data from different of the selected associated wireless communication devices is less than a length of a cyclic prefix of a symbol.

19. A method of communicating with a plurality of wireless communication devices comprising:
transmitting a downlink polling frame addressed to selected ones of the wireless communication devices, the downlink polling frame to indicate to each selected associated wireless communication device communication parameters for use in subsequently transmitting uplink headers;
receiving uplink data substantially simultaneously from the selected associated wireless communication devices on data subcarriers of a multicarrier communication channel through a plurality of receive antennas;

separating the uplink data received for each of the selected associated wireless communication devices based on channel estimates generated from the uplink headers;

determining a number of wireless communication devices associated with a wireless communication device having quality-of-service level applications operating thereon; and selecting a predetermined number of the wireless communication devices based on a number of the receive antennas available to receive communication signals from the wireless communication devices.

20. The method of claim 19 the method is performed by either an access point operating in a wireless local area network or a broadband wireless communication device operating in a wireless metropolitan area network, wherein when the method is performed by the access point, the number of the receive antennas comprises at least two, and wherein when the method is performed by the broadband wireless communication device, the number of the receive antennas comprises at least four.

21. The method of claim 19 wherein the downlink polling frame is transmitted using a single one of a plurality of transmit antennas.

22. The method of claim 21 wherein the uplink headers and the uplink data are transmitted by each of the selected associated wireless communication devices using a single transmit antenna.

23. The method of claim 19 wherein the separated data corresponds to the uplink data transmitted by each of the selected associated wireless communication devices, and wherein the method further comprises:
multiplexing the separated data; and
providing frame boundaries to select frames of the separated data associated with each wireless communication device for subsequent decoding.

24. The method of claim 23 further comprising:
providing bit boundaries when data is received from a single wireless communication device; and
selectively coupling either a bit clock or a frame clock with a multiplexer, the frame clock being coupled when the uplink data is being received substantially simultaneously from a plurality of selected associated wireless communication devices, the bit clock being coupled when uplink data is being received at different times from wireless communication devices.

25. A system comprising:
two or more substantially onmidirectional receive antennas;
transmitter circuitry to transmit a single downlink polling frame addressed to selected associated wireless communication devices having time-sensitive applications operating thereon, the downlink polling frame to indicate to each selected associated wireless communication device communication parameters for use in subsequent transmission of uplink headers; and
the signal processing circuitry to separate uplink data substantially simultaneously received for each of the selected associated wireless communication devices based on channel estimates generated from the uplink headers.

26. A system comprising:
two or more substantially onmidirectional receive antennas;
transmitter circuitry to transmit a downlink polling frame addressed to selected associated wireless communication devices, the downlink polling frame to indicate to each selected associated wireless communication device communication parameters for use in subsequent transmission of uplink headers;

the signal processing circuitry to separate uplink data substantially simultaneously received for each of the selected associated wireless communication devices based on channel estimates generated from the uplink headers; and receiver circuitry to receive uplink data substantially simultaneously from the selected associated wireless communication devices on data subcarriers of a multicarrier communication channel through a plurality of receive antennas, wherein the number of the receive antennas used to receive the uplink data is at least as great as a number of the selected associated wireless communication devices, wherein the receiver circuitry generates received signals associated with each of the receive antennas for subsequent processing by signal processing circuitry, wherein the receiver circuitry receives the uplink headers from each of the selected associated wireless communication devices through the plurality of receive antennas, the uplink headers being transmitted substantially simultaneously by each of the selected associated wireless communication devices in accordance with the associated communication parameters to allow the wireless communication device to uniquely identify one of the received uplink headers with the selected associated wireless communication devices.

27. The system of claim 26 wherein each wireless communication device has an address associated therewith, wherein the downlink polling frame comprises a preamble sequence associated with each address of the selected associated wireless communication devices, wherein each of the preamble sequences associated with a set of subcarriers of the multicarrier communication channel, wherein the selected associated wireless communication devices substantially simultaneously transmit the uplink headers in accordance with their associated preamble sequence and associated set of subcarriers, and wherein the signal processing circuitry generates a channel estimate for each of the selected associated wireless communication devices from the received uplink headers based on the preamble sequence and subcarriers associated with each of the selected associated wireless communication devices.

28. A computer-readable medium that stores instructions for execution by one or more processors to perform operations comprising:

generating a single downlink polling frame addressed to selected ones of the wireless communication devices having time-sensitive applications operating thereon, the downlink polling frame to indicate to each selected associated wireless communication device communication parameters for use in subsequently transmitting uplink headers;

processing uplink data substantially simultaneously from the selected associated wireless communication devices on data subcarriers of a multicarrier communication channel through a plurality of receive antennas; and separating the uplink data received for each of the selected associated wireless communication devices based on channel estimates generated from the uplink headers.

29. A computer-readable medium that stores instructions for execution by one or more processors to perform operations comprising:

generating a downlink polling frame addressed to selected ones of the wireless communication devices, the downlink polling frame to indicate to each selected associated wireless communication device communication parameters for use in subsequently transmitting uplink headers;

processing uplink data substantially simultaneously from the selected associated wireless communication devices on data subcarriers of a multicarrier communication channel through a plurality of receive antennas; and separating the uplink data received for each of the selected associated wireless communication devices based on channel estimates generated from the uplink headers, wherein a number of the receive antennas used to receive the uplink data is at least as great as a number of the selected associated wireless communication devices, and wherein the method further comprises generating received signals associated with each of the receive antennas from the received uplink data for subsequent processing using the channel estimates, wherein the operations further comprise receiving the uplink headers from each of the selected associated wireless communication devices through the plurality of receive antennas, the uplink headers being transmitted substantially simultaneously by each of the selected associated wireless communication devices in accordance with the associated communication parameters to allow a receiving wireless communication device to uniquely identify one of the received uplink headers with the selected associated wireless communication devices.

30. The computer-readable medium of claim 29 wherein wherein each wireless communication device has an address associated therewith,
  wherein the downlink polling frame comprises a preamble sequence associated with each address of the selected associated wireless communication devices,
  wherein each of the preamble sequences associated with a set of subcarriers of the multicarrier communication channel, and
  wherein the selected associated wireless communication devices substantially simultaneously transmit the uplink headers in accordance with their associated preamble sequence and associated set of subcarriers, and
  wherein the operations further comprise generating a channel estimate for each of the selected associated wireless communication devices from the received uplink headers based on the preamble sequence and subcarriers associated with each of the selected associated wireless communication devices.

* * * * *

UNITED STATES PATENT AND TRADEMARK OFFICE
CERTIFICATE OF CORRECTION

| | | |
|---|---|---|
| PATENT NO. | : 7,466,964 B2 | Page 1 of 1 |
| APPLICATION NO. | : 11/172449 | |
| DATED | : December 16, 2008 | |
| INVENTOR(S) | : Sondur | |

It is certified that error appears in the above-identified patent and that said Letters Patent is hereby corrected as shown below:

On the title page, item (56), under "U.S. Patent Documents", in column 2, line 10, delete "Le" and insert -- Li --, therefor.

In column 17, line 48, in Claim 25, delete "onmidirectional" and insert -- omnidirectional --, therefor.

In column 17, line 63, in Claim 26, delete "onmidirectional" and insert -- omnidirectional --, therefor.

In column 20, line 8, in Claim 30, before "each" delete "wherein".

Signed and Sealed this

Twenty-third Day of February, 2010

David J. Kappos
*Director of the United States Patent and Trademark Office*